W. F. ZIMMERMANN.
WORM GRINDER.
APPLICATION FILED JULY 23, 1918.

1,304,644.

Patented May 27, 1919.
6 SHEETS—SHEET 1.

INVENTOR
William F. Zimmermann
By Albert F. Nathan
Atty

W. F. ZIMMERMANN.
WORM GRINDER.
APPLICATION FILED JULY 23, 1918.

1,304,644.

Patented May 27, 1919.
6 SHEETS—SHEET 2.

INVENTOR
William F. Zimmermann
Albert F. Nathan
atty

W. F. ZIMMERMANN.
WORM GRINDER.
APPLICATION FILED JULY 23, 1918.

1,304,644.

Patented May 27, 1919.
6 SHEETS—SHEET 3.

INVENTOR
William F. Zimmermann
Albert F. Nathan
Atty

W. F. ZIMMERMANN.
WORM GRINDER.
APPLICATION FILED JULY 23, 1918.

1,304,644.

Patented May 27, 1919.
6 SHEETS—SHEET 4.

INVENTOR
William F. Zimmermann
Albert F. Nathan
Atty

W. F. ZIMMERMANN.
WORM GRINDER.
APPLICATION FILED JULY 23, 1918.

1,304,644.

Patented May 27, 1919.
6 SHEETS—SHEET 5.

UNITED STATES PATENT OFFICE.

WILLIAM F. ZIMMERMANN, OF NEWARK, NEW JERSEY.

WORM-GRINDER.

1,304,644.　　　　　Specification of Letters Patent.　　Patented May 27, 1919.

Application filed July 23, 1918. Serial No. 246,291.

*To all whom it may concern:*

Be it known that I, WILLIAM F. ZIMMERMANN, a citizen of the United States, and residing at Newark, in the county of Essex and State of New Jersey, have invented a new and Improved Worm-Grinder, of which the following specification is a full disclosure.

This invention deals with grinding machines, and it relates especially to the species thereof known as worm grinders.

Heretofore, worm grinders have always embodied a differential gear mechanism as an essential and unavoidable sub-combination in the general mechanism. The ability of these prior machines to grind helices has been dependent upon the functioning of the differential, and it has not been heretofore perceived how the use of a differential mechanism could be avoided, although it has been recognized that such a mechanism materially complicates the mechanical structure and tends to impair the ultimate precision of the grinding operation.

This invention not only proposes a worm grinder free from differentials but also provides a "universal" mechanism, *i. e.*, one readily adjustable to accommodate various sorts and sizes of worms.

Other objects and advantages will be in part indicated in the following description and in part rendered apparent therefrom in connection with the annexed drawings.

To enable others skilled in the art to so fully apprehend the underlying features hereof that they may embody the same in the various ways contemplated by this invention, drawings depicting a preferred typical construction have been annexed as a part of this disclosure, and in such drawings like characters of reference denote corresponding parts throughout all the views, of which:—

Before explaining the way in which this universal organization is adjusted to accurately grind any desired helix, the general structure of this embodiment will first be described. Generally speaking, the mechanism resolves the rotary motion derived from the prime mover into four component motions, to wit, a translation of the blank axially, a rotation of the blank about its axis, a bodily translation of the grinding wheel transversely to the axis of the blank, and a rotation of the grinding wheel about its axis. The first three of these component movements are so coördinated as to proceed in any desired cycle and at any desired ratio so as to permit the grinding of either right hand or left hand helices together with proper automatic indexing. For example, the blank may be translated axially toward the left and simultaneously rotated either clock-wise or anti-clockwise and, at the end of this stroke, its direction of translation and rotation will both be automatically reversed. Either stroke may be utilized as the working or feeding stroke and the reverse will serve as the "return" stroke. The grinder head may be shifted into working proximity with the blank at the beginning of either stroke and, at the end of the stroke, it will be automatically withdrawn transversely to the stroke until the next feeding stroke begins. During the interval between the end of a given working stroke and the beginning of the next succeeding working stroke, a predetermined indexing of the blank will occur so that the grinding wheel will be in correct relation with the next spiral or thread of the blank.

The movements will first be graphically analyzed before proceeding with the description of the specific structural elements shown for putting these movements into practical effect.

Referring to the kinematic diagram (Fig. 18), it may be noted that the characters composing the various lines of transmission correspond with the characters applied to the mechanical elements of the machine illustrated. A grinder wheel is indicated by U and the blank or work to be helically ground is indicated by W. These elements are carried respectively by a grinder head or carriage $y$ and a work support or table 24. These elements $y$ and 24 are so related to one another as to permit of relative movement in two different directions, preferably at right angles to each other. The relative movement in the one direction is utilized for the "feed" and the "return" strokes. The relative movement normal thereto is utilized for the separation between the work and the cutter during the return stroke and for the bringing of the work and the cutter into contact preparatory to the "feed" stroke. These relative movements are practically effected by means of an intermediate body element A to which the cutter carriage and blank supporting table are slidably secured respectively at right angles. In the illustrated machine, the body element A is made large and massive so as to serve also as the base for the mechanism. One branch of the transmission has the effect of producing a reciprocation between the intermediate element and the table; while another branch of the transmission similarly produces a reciprocation between the cutter support and the intermediate body element. These operations are so timed that the cutter is in contact with the blank during the working stroke and is clear of the blank during the return stroke. The grinding wheel U is also rotatably mounted on the carriage or head $y$ by means of a spindle T; and in like manner, the blank W is rotatably supported on the table by means of a spindle $h$. One branch of the transmission rotates the cutter spindle and another branch rotates the blank supporting spindle, and both of these function simultaneously with the relative translation between the parts $y$ and 24, with the result that a helical line of contact between the cutter and blank is produced.

Figure 18:
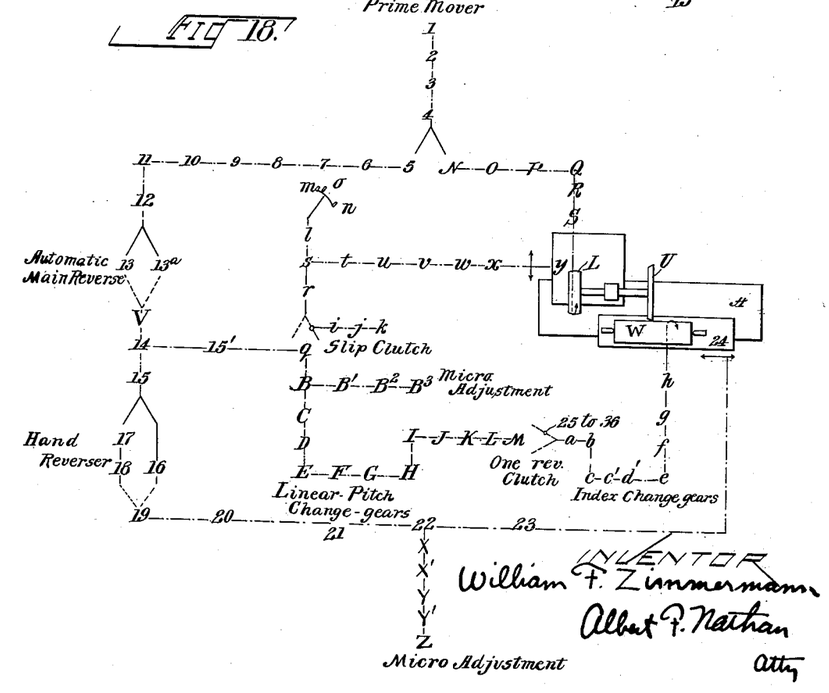
Fig. 18 is a diagrammatic layout showing the scheme of transmission with the main line and branch lines, together with the various controls thereof.

Starting with the prime mover 1, a transmission line 1—2—3—4—N—O—P—Q—R—S—T extends to the cutter spindle so as to rotate it. This rotation is continually maintained so long as the prime mover is operating and is independent of any other functioning of the mechanical organization. The motion of the prime mover also flows along another line (through a reverser) to the element 14 and therebeyond in three general branches: for rotating the work, for feeding and returning the work, and for contacting with and withdrawing the cutter from the work. Thus, motion flows through 1—2—3—4—5—6—7—8—9—10—11—12—13 (or 13ᵃ)—V—14. The part V is a reversing clutch so that by actuating this part (which is done automatically) the return stroke, the withdrawal, the reverse rotation and preparatory indexing of the blank all are accomplished. The transmission line for causing the approach and recession of the cutter operates faster than the feeding transmission so as to get the cutter into and away from the work in a fraction of the entire stroke and also transmits the motion impositively so that the accuracy of a fixed stop may be utilized in limiting the extent of approach of the cutter to the blank. This transmission consists of the elements 14—15'—$p$—$q$ (a friction slip clutch)—$r$—$s$—$t$—$u$—$v$—$w$—$x$—$y$. The element $s$ is rigidly connected with an element $l$ bearing two adjustable stops $m$ and $n$ which are movable against a stationary stop $o$; thereby limiting the extent of movement of the part $s$ and consequently proportionately limiting the movements of the cutter support $y$; a slippage occurring between the parts $r$ and $q$ throughout the continued functioning of the two remaining transmission lines which feed the table and rotate the blank. The table feeding transmission consists of the elements 14—15—16 or 17)—18—clutch 19—20—21—22—23. The clutch 19 permits of a reversal corresponding to a right hand or a left hand thread on the worm being ground. A micrometer adjustment is obtained at the part 22 by means of the elements X, X', Y', Y, and Z, as will be hereinafter explained. The transmission for rotating the blank includes the elements B—C—D—(E—F—G—H, constituting change gears)—I—J—K—L—M—clutch a—b—(c—c'—d—e—index change gears)—f—g—h. The clutch $a$ is a one-revolution clutch and it functions automatically immediately preliminary to effecting the reversal in the rotation of the blank in such a manner as to effect an indexing of the blank while it is stationary, i. e., it utilizes the stationary interval of the blank for indexing purposes and thus neither indexes by actually retarding or accelerating the rotation of the blank. It will be noted that these last two transmissions in fact form a continuous chain from the blank supporting spindle to the lead screw of the table so that the rotations of the spindle have a definite relation to the translation of the table and this definite relation is predetermined through the agency of two change gear systems consisting respectively of the elements E—F—G—H and the elements c—c'—d'—e respectively. These two change gears are herein referred to as the "linear pitch" change gear and the "index" change gear respectively and are utilized in adjusting the machine in accordance with certain formulæ hereinafter explained whereby the organization is enabled to grind accurately worms of any nature. The mechanism itself may now be understood to better advantage.

Figures 15, 16:
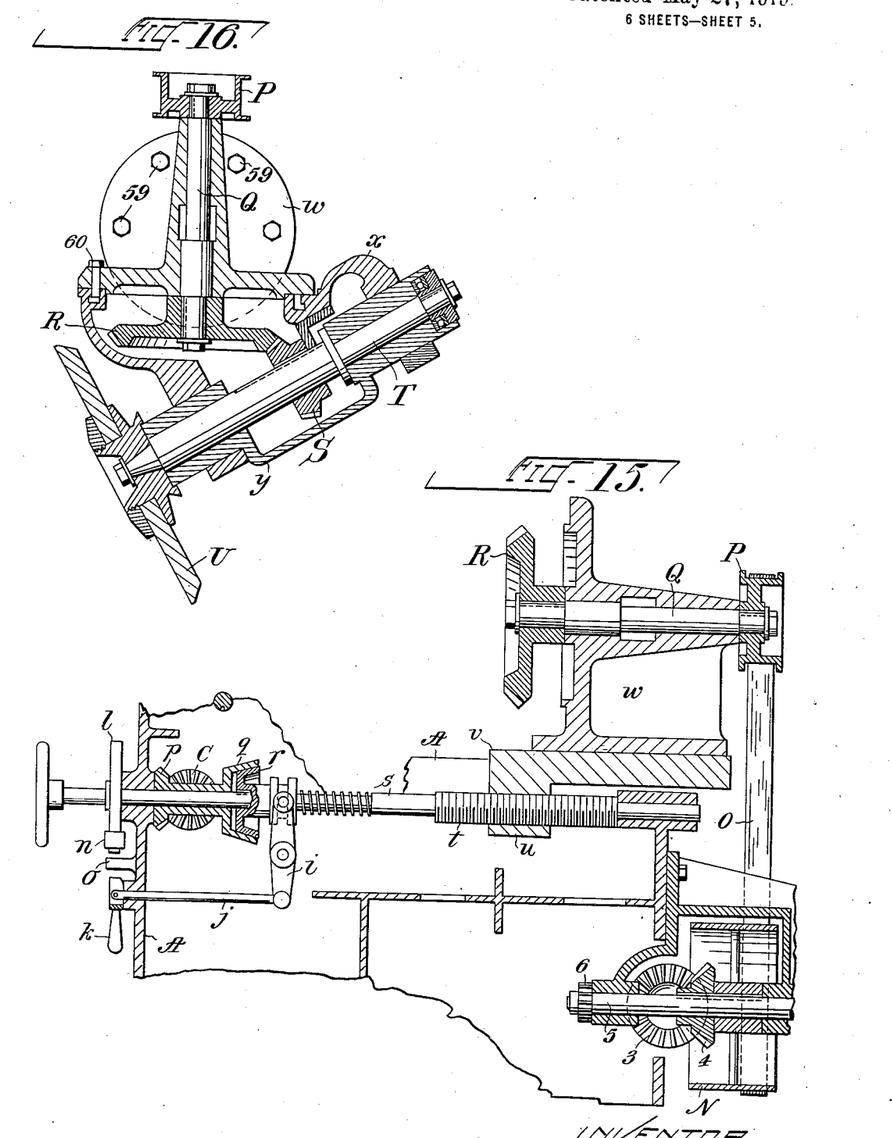
Fig. 15 is a vertical section through line 15—15 of Fig. 2 showing, in assembled relation, the mechanism for shifting the grinder head transversely to the work and illustrating also the friction means for arresting the movement of the head at its two predetermined limits of stroke and also showing the hand lever for disconnecting the head shifter from the source of power.
Fig. 16 is a section of the grinder head and wheel through line 16—16 of Fig. 1.
Figure 17:
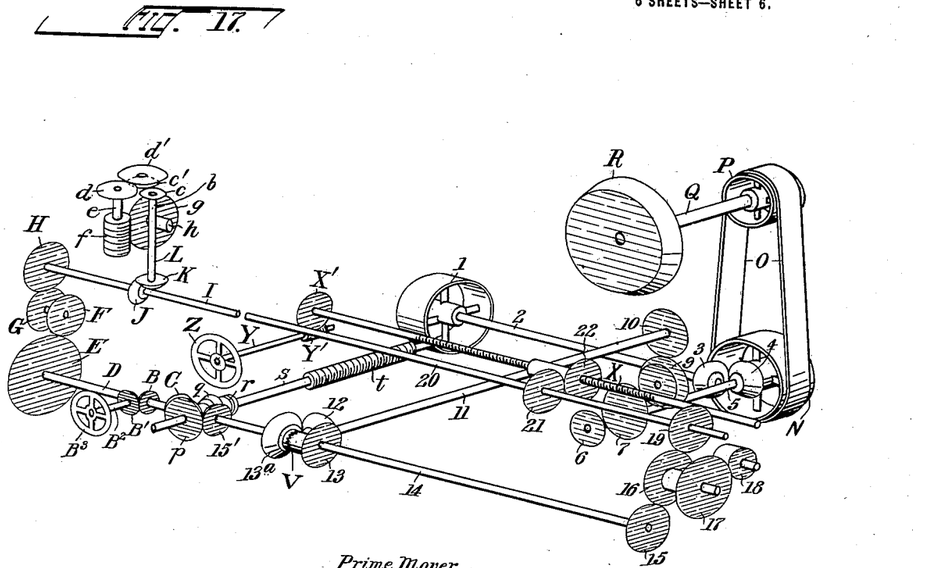
Fig. 17 is a skeleton perspective of the general transmission.

The general frame or base of the machine is indicated by A and journaled in the rear thereof is the main drive shaft 2 which carries the main drive pulley 1 and also the bevel gear 3 pivoted thereto so as to mesh permanently with a companion bevel gear 4 keyed to a shaft 5 which carries the pulley N and a pinion 6. A belt O (Fig. 15) extends from the pulley N to a pulley P secured to a shaft Q which is journaled in the grinder head and has affixed to its other end a bevel gear R which meshes with a bevel gear S keyed to the spindle T of the abrasive wheel or cutter U. These elements constitute the transmission extending from the source of power for the purpose of rotating the abrasive wheel. The grinder head consists of a carriage $v$ so mounted on the base A as to permit of a lateral reciprocation thereon. This mounting is effected through a conventional slideway such as an ordinary dovetail slideway. In order to permit the abrasive wheel to be set at any predetermined angle with relation to the worm being cut, the grinder head consists of a number of adjustable parts including a standard $w$ pivotally secured to the carriage $v$ so as to be capable of being turned through the various angles about a horizontal axis; bolts 59 serving to lock the same against movement after adjustment. The shaft Q is journaled in the standard $w$ and a casting $x$ is pivotally secured to the vertical face of the standard $w$ so that it may be rotated about the axis of the shaft Q. Bolts 60 are provided to lock these parts in any preadjusted position. The bearing $y$ is in turn secured to the casting $x$ and the shaft T is journaled in this bearing. It will be seen that this permits the casting $x$ to be swung about the standard $w$ while maintaining the gears R and S in mesh.

The means for shifting the grinder head toward and from the work includes the pinion 6, the intermediate gear 7, the intermediate gear couplet 8—9, and the pinion 10 secured to the transverse shaft 11. These gears permit changes in the main driving speeds of the machine to be made. At its forward end, the shaft 11 is keyed to a bevel gear 12 which meshes with the two opposing bevel gears 13 and 13$^a$ normally loose on the longitudinal drive shaft 14. A clutch V is splined to the shaft 14 so that, in its midway position, the shaft 14 will not be connected at all with either of said two bevel gears but may be rotated either clockwise or anti-clockwise by shifting the clutch into engagement with the one or the other of said gears. This constitutes the general reverse mechanism of the machine; said reverse simultaneously effecting all of the movements of the cutter and blank with the exception of the rotations of the cutter which are independent. At its left end, the shaft 14 is provided with a bevel gear 15' which permanently meshes with a bevel gear $p$ on a sleeve providing also a cone socket $q$ for the reception of the friction clutch $r$ splined to the transverse shaft $s$ having screw threads $t$ which engage a nut $u$ on the carriage $v$ of the grinder head. It will be seen that, dependent upon the position of the clutch V, these parts may shift the grinder head in or out. The limits of movement of the carriage $v$ are determined by the positions of certain lugs $m$ and $n$, which are adjustably secured to the periphery of the disk $l$ affixed to the forward end of the shaft $s$. These lugs are adapted to contact with a stationary stop $o$ extending from the base A of the machine and thereby arresting further rotations of the screw threaded shaft $s$ and consequently limit the stroke of the carriage $v$. It may be noted that the friction clutch $r$ provides only sufficient friction to permit the shaft $s$ to be rotated readily when not stopped by the lugs *m* and *n*. Therefore, the grinder head is shifted by an impositive drive. Should it be desired to shift the grinder head manually, the small lever *k* may be moved to pull forward the tension rod *j* and swing the clutch fork *i* clockwise so as to withdraw the clutch *r*. This entirely frees the shaft *s* from the driving transmission and enables it to be readily turned by means of the hand wheel at its forward extremity.

Figure 1:
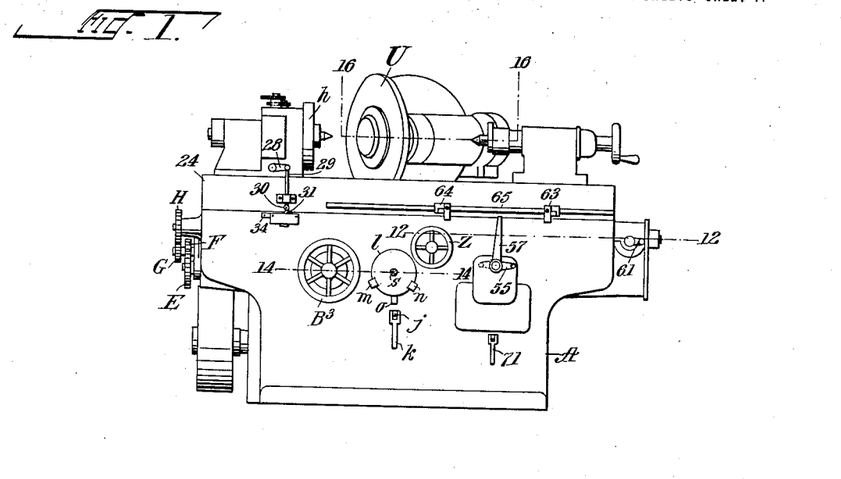
Figure 1 is a front elevation of a grinder conforming to this invention.
Figure 2:
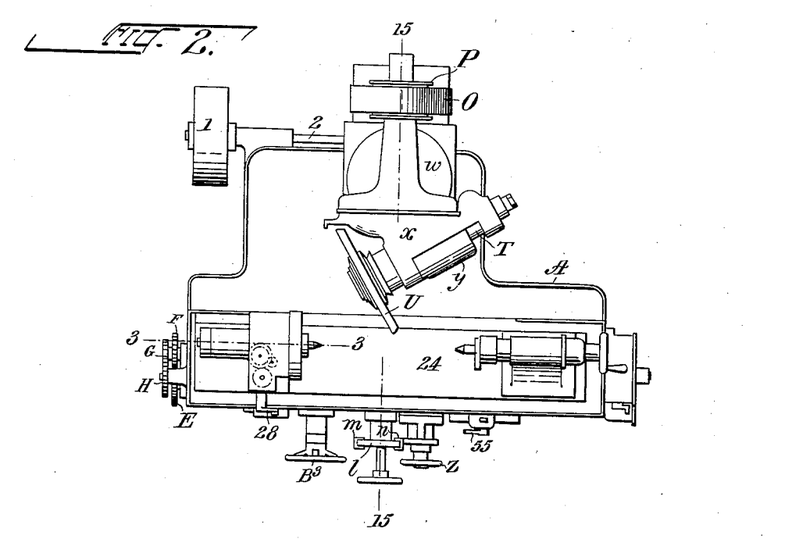
Fig. 2 is a plan thereof.
Figures 3, 4, 5, 6:
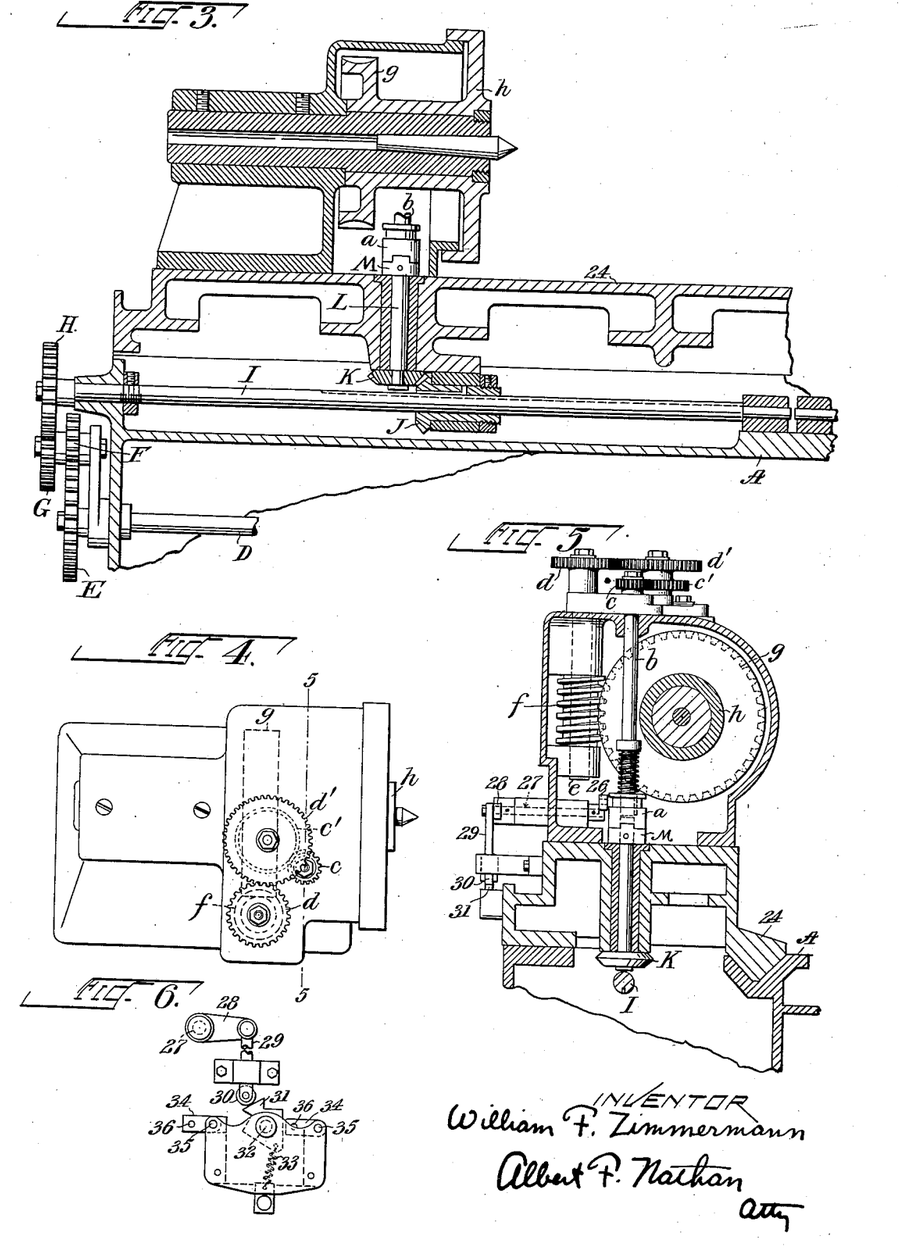
Fig. 3 is a vertical section along line 3—3 of Fig. 2 showing a detail of the automatic "one revolution" indexer.
Fig. 4 is an enlarged plan of the head and spindle which positions the blank.
Fig. 5 is a section through line 5—5 of Fig. 4 showing the assembled "one revolution" automatic indexer.
Fig. 6 is a detail of the assembly trip device which is adapted to be set for automatic operation in either direction of travel of the table.
Figure 7:
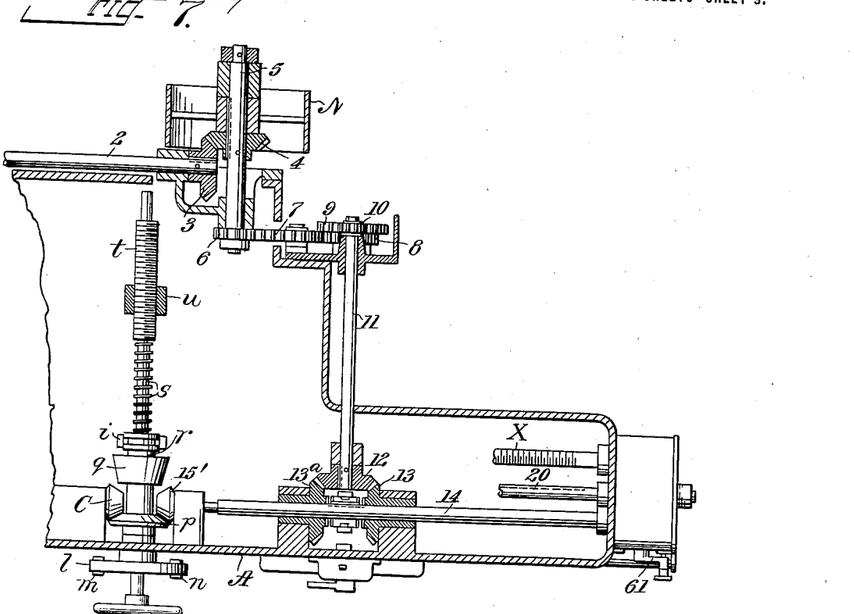
Fig. 7 is a fragmentary horizontal section showing the main drive shaft and the transmission therefrom (including the stroke reversing clutch) to the feed screw and nut for shifting the grinder head toward and away from the work, a pulley for transmitting rotations to the grinding wheel and a part of the transmission for causing the table to advance and return.
Figure 10:
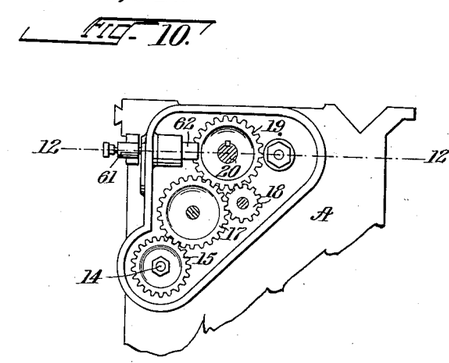
Fig. 10 is an end view of the reversing and change gear box, shown at the right of Fig. 7.
Figure 11:
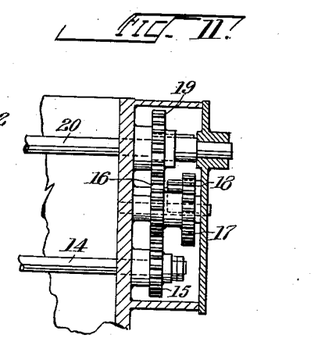
Fig. 11 is an elevation of the same with the front of the box casing broken away to show the gearing.
Figure 12:
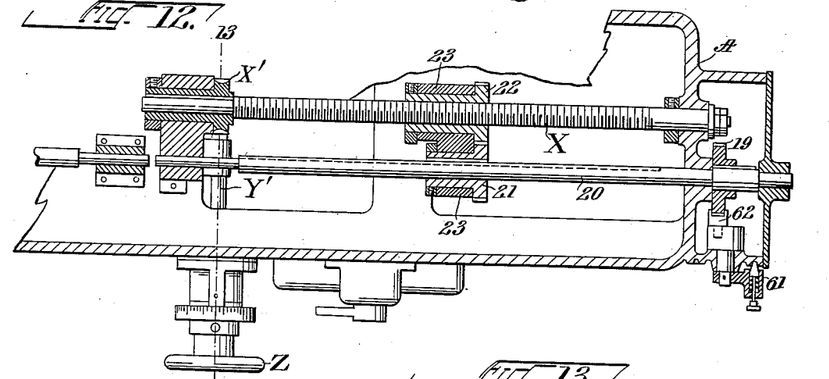
Fig. 12 is an assembled section through lines 12—12 of Figs. 10 and 11, respectively, showing the transmission for feeding the table to and fro and the reverser for enabling the feeding stroke to be effected either toward the right or toward the left independently of the direction of rotation of the spindle.
Figures 13, 14:
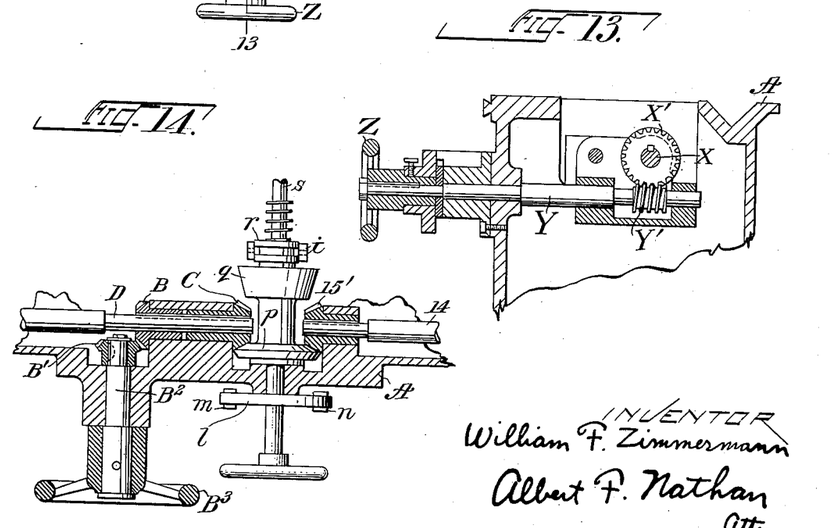
Fig. 13 is a vertical section on line 13—13 of Fig. 12 showing the hand wheel for effecting a micrometer adjustment of the table feed.
Fig. 14 is a fragmentary horizontal section through line 14—14 of Fig. 1 showing a part of the screw for shifting the grinder head toward and away from the work and of the hand wheel for manually doing the same thing.

The reciprocations of the table are effected by motion derived from the shaft 14 which, at its right end, enters a reverse box at the right of the machine (see Figs. 10 and 11) and at its extremity has keyed to it a pinion 15. This pinion meshes with the intermediate gear 16 which is integral with the gear 17. An idler 18 permanently meshes with the gear 17 and is in such a position that the gear 19 (splined to shaft 20) may be shifted to mesh either with gear 16 or 17 and thereby drive the splined shaft 20 either clockwise or anti-clockwise. This shifting may conveniently be effected by means of a hand lever 61 carrying a yoke 62 embracing the sides of the shiftable gear 19, as shown best by Fig. 12. The splined shaft 20 extends longitudinally in parallelism with a lead screw X which is journaled in the main frame or base A but which is normally held from rotation except for purposes of adjustment. A pinion 21 is splined to the shaft 20 and has a driving mesh with a nut 22 engaging the lead screw X. The pinion 21 and the nut 22 are both journaled in a lug 23 extending downwardly from the table 24 which is slidably carried by the base A, as shown by Fig. 5. This arrangement causes the table to feed either right or left, depending upon the direction of rotation of the shaft 20. In setting up the work, it is desirable to effect a preliminary longitudinal adjustment of the table and this is done by means of a worm wheel X' keyed to the lead screw X. By rotating this worm, the lead screw will be turned and the table will be shifted accordingly. As shown by Fig. 13, this rotation is effected through a worm Y' affixed to a shaft Y which may be turned by a hand wheel Z provided with a conventional micrometer adjustment.

The rotation of the blank is effected by a branch line transmission extending from the bevel gear *p* (see Fig. 14). Secured to the end of the shaft D is a bevel gear C in mesh with the bevel gear *p* and this shaft D (see Fig. 3) extends to a change gearing arranged on the left of the machine and consisting of the gears E, F, G, and H. This change gearing will be referred to later as the linear pitch gears. A shaft I extends from the gear H longitudinally and has splined thereto a bevel gear J journaled in a lug extending downwardly from the table 24. A vertical shaft L has a bevel gear K at its lower end meshing with the gear J and at its upper end is provided with a dog-tooth clutch M which, as here arranged, acts as a one-revolution clutch.

Referring to Fig. 5, a shiftable clutch element is splined to a vertical shaft *b* which, at its upper end, is secured to a gear *c* meshing with an intermediate gear *c'* integral with another intermediate gear *d'* meshing with the gear *d* secured to the upper end of the shaft *e*. The shaft *e* provides a worm *f* meshing with a worm wheel *g* secured to the spindle *h* which in turn supports and rotates the blank. The gears *c*, *c'*, *d'*, and *d* may be termed index change gears.

The means for automatically indexing the worm is shown best by Figs. 5 and 6. The crank arm 26 engages a groove in the clutch *a* to lift and disengage it from the counterpart clutch M and disengage the spindle from the source of power as soon as the parts have ceased rotating preparatory to a reversal of the drive. The indexing takes place during this idle interval and before the reverse rotation begins. In other words, the commencement of the rotation of the spindle is deferred for a sufficient interval to achieve the indexing. This is done by an automatic trip mechanism comprising a shaft 27 that lifts the arm 26 and the clutch *a* momentarily, i. e., long enough to permit one idle revolution of the part M to take place. The shaft 27 is actuated by a crank arm 28 from the end of which depends a plunger 29 carrying a roller 30 which is lifted by a click-pawl 31. This pawl is pivoted at 32 and is actuated by a spring 33. Two similar dogs 34 are pivoted in symmetrical relation with the pawl at points 35 and are provided with pins 36 which determine their setting relation with said pawl. The pawl 31 is symmetrical and the dogs can be so arranged that it will trip the plunger 29 only when moving either to the left or to the right, as the case may be. The pawl and its parts are mounted on the base A and, if desired, may be adjustable therealong.

The action of these parts will be understood by referring to Fig. 6. When the trip 29 approaches the pawl 31 from the right, it goes freely past it (the pawl merely turning about its pivot) but when it moves to the right, it is unable to turn the pawl 31 by reason of the abutment afforded by the pin at the right of pawl and consequently the pawl will lift the plunger 29 and the clutch *a* will be disengaged. This clutch will stay disengaged while the plunger is riding over the face of the pawl 31 which corresponds to an interval representing one revolution of the part M. It will be observed that the lifting action immediately follows the act of reversal in the travel of the table so that the spindle H does not acquire its motion in the new direction until after one revolution of the clutch M. The amount of angular motion thereby "lost" by the spindle will represent the extent of indexing required by the number of teeth in the blank and will be determined by the preselected ratio for the change gears $c$, $c'$, $d'$, and $d$ previously described. The mechanism for automatically reversing the table at the ends of its strokes will now be described.

Figure 8:
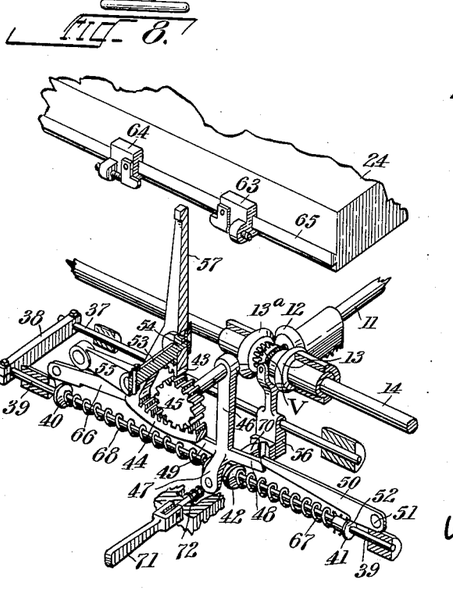
Fig. 8 is a fragmentary perspective of an automatic snap-action reversing means showing the dogs adjusted on the table for actuating the same.

The automatic reverse mechanism is of the double snap-action type and it is actuated at the respective extremities of the stroke by means of dogs adjustably mounted on the reciprocating table. It is shown in perspective in Fig. 8 and it comprises a lever 57 pivoted on a pivot 54, which is adjustable by being in turn eccentrically mounted for the reasons explained below. This lever 57 is provided with two segmental racks 43 and 44; either one of which may be brought into mesh with a pinion 45 by shifting the position of the pivot 54. The lever 57 is adapted to be swung to the right and left by means of one or the other of the dogs 63 and 64 adjustable along the rail 65 moving with the reciprocating table 24. When the lever 57 is moved to the left by dog 63, it will rotate the pinion 45 clockwise if the segmental rack 43 be engaged, or anti-clockwise if the rack 44 be engaged. As a result, the arm 46 may be caused to swing either to the right or to the left when the lever 57 swings to the left, dependent upon the position of the eccentric pivot 54. The arm 46 terminates at its lower extremity in a yoke 47 and two wings 48 and 49 which operate to release the catches 50 and 66, respectively. The yoke 47 engages a collar 42 against the opposite sides of which the springs 67 and 68 abut; said springs bearing at their opposite ends respectively on the shoulders 41 and 40 secured to the rod 39. The rod 39 is rigid with an arm 38 rigidly extending from a rod 37 which carries a yoke 56 that engages with the clutch V so as to shift said clutch either to the right or to the left, dependent upon the movement of the rod 39 to the right or the left. The catches 50 and 66 are similar in construction. Thus, the catch 50 is pivoted at 51 and has a projection 52 adapted to engage the shoulder 41 and prevent movement of the rod 39 to the right when the spring 67 is compressed by the movement of the arm 46 to the right. When the compression reaches a certain point, however, the extension 48 from the arm 46 will leave the catch 50 and release the shoulder 41; whereupon the now compressed spring 67 will operate to abruptly throw the rod 39 and, correspondingly, the clutch V to the right. By this means, the reversal of the travel of the table is effected abruptly in either direction. The pivot 54 is eccentric to the shaft 53 and the latter shaft may be rotated 180° by means of a hand-operated lever 55 arranged on a forward part of the machine so that either the segmental rack 43 or the segmental rack 44 may be engaged with the pinion 45 as before stated. This permits the clutch V to be engaged with the bevel gear 13 or with the bevel gear 13ª, say at the extremity of the stroke of the table to the right. This enables a proper reversing action to be obtained irrespective of the position of the hand reversing device shown by Figs. 10 and 11. That is to say, if the hand lever 61 be moved to the right or left to shift the gear 19 into a direct or a reversing drive, the hand lever 55 on the automatic reverser can be adjusted accordingly so as to have the same general effect on the machine irrespective of the change effected by the reverse lever 57.

Figure 9:
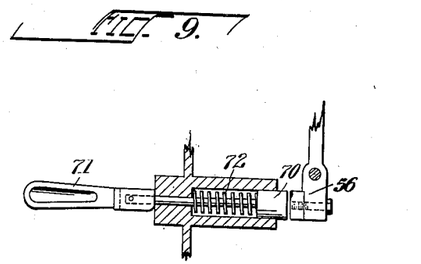
Fig. 9 is a detail of the hand lever for rendering said automatic reverser inoperative and disconnecting all but the abrasive wheel from the source of power.

Should it be desired to render this instrumentality ineffective, this may be done by means of the device shown in Fig. 9 in which the spring-pressed plunger 70 is adapted to interlock with the yoke 56 to prevent any lateral movement thereof when the hand lever 71 is moved to a position enabling the part 70 to be forced by the spring 72 into said interlocking arrangement.

The universality of the foregoing non-differential mechanism—admitting of adjustment for any species of helical worm grinding—will now be explained.

By reason of the intervening positive-motion transmission, the table or work-support will be translated a definite distance for each rotation of the blank. Conversely, for each unit of distance the table is advanced, the blank will rotate proportionately. The extent of this relative motion will be determined by the rotary value of the transmission which, in turn, depends for its value upon the fixed constants of the machine (the ratios of the permanently meshing parts), as qualified by whatever values may be arbitrarily given to the two change-gear sets included in serial relation in the transmission.

The complete transmission may be regarded as consisting of two sections in series, to wit, the first section extending from the lead-screw to the clutch element "M" and the second section extending from "M" to the spindle. Let S be the lead of the lead-screw; then S and a gear ratio $C'$ will be constants of the first section, and U will represent the unknown value of the variable change-gear set. So also, let $C''$ represent the machine constant of the second section and V the value of the variable change-gear set. These values may be expressed either in terms of the revolutions of the respective parts, or in terms of the ratios of the teeth of the driving change-gear to the teeth of the driven change-gear. The latter is here used for the U-value of the "linear-pitch" gear set and the V-value of the "index" gears. The value in terms of the teeth ratio is, of course, the reciprocal of the value in terms of the revolution ratio.

Suppose we wish to adjust the machine to grind a worm having for its lead the value L and having any desired number of teeth or threads N. Then, for indexing purposes, it will be necessary to so adjust the value of the second section that the part M will rotate N times as fast as the spindle, since each time we skip a revolution of M (by means of the one-revolution clutch), it must be equivalent to arresting the rotation of the spindle to the extent of the amount represented by one tooth. We then have:

$$\frac{\text{revs. of spindle}}{\text{revs. of part M}} = \frac{1}{N} = \frac{1}{C''} \times V\left(\frac{\text{driver}}{\text{follower}}\right)$$

Hence $$V = \frac{1}{C''} \times \frac{1}{N} \quad i.\ e.,\ V = \frac{C''}{N}$$

where the machine constant $C''$ is expressed in terms of revolutions and the variable N is expressed in terms of teeth ratio:

$$\frac{\text{driver}}{\text{follower}}.$$

Hence, if we assign to U a value represented by $\frac{K''}{N}$, we will cause the part M to rotate N times for each revolution of the spindle, and consequently, whenever we skip one revolution of M, we will have produced a lag in the spindle equal to one-Nth of a revolution, i. e., equal to one tooth of the worm to be ground.

Having thus fixed the value of the second section of the transmission (from the part M to the spindle), we must now regard this section as a constant and then so adjust the value of the variable U in the other as to cause the table to advance at the same rate the helix of the worm advances, so as to maintain the grinding-wheel continuously in contact with the thread or tooth to be ground. Accordingly, we must find the value of U in the ratio:

$$\frac{\text{advance of helix}}{\text{advance of table}} = \frac{1}{C'} \times U \times \frac{1}{C''} \times \frac{C''}{N} =$$

$$\frac{\text{revs. spindle}}{\text{revs. lead-screw}} = \frac{1}{L}$$

Since S is a machine constant, the rotations of the spindle relative to the spindle may be expressed by the equation:

$$U \times \frac{1}{C'} \times \frac{1}{N} = \frac{1}{L} \text{ and } U = C'\frac{N}{L}$$

According to the formulæ, conventional in the art, the value of L, in terms of the various characteristics of a worm, is as follows:

$$L = \frac{NP^{NC}}{\sin \alpha} = \frac{NP^{C}}{\tan \alpha} = NP^{L}$$

where "$\alpha$" is the angle between the thread and a line parallel with the axis, $P^C$ is the circular pitch of the worm, $P^{NC}$ is the normal circular pitch of the worm, and $P^L$ is the linear pitch of the worm.

Substituting these values of L, we have the following values for U, i. e., for the tooth ratio $\left(\frac{\text{driver}}{\text{follower}}\right)$ of the change-gears in the first section of the transmission:

$$U = C'\frac{\sin \alpha}{P^{NC}} = C'\frac{\tan \alpha}{P^C} = C'\frac{1}{P^L}$$

It has been shown, accordingly, that the machine, although devoid of the heretofore unavoidable differential indexer, is nevertheless universal in its capacity for grinding worms of diverse leads, teeth, angles, etc. This end is achieved by assigning to the "index" gear-set the value $\frac{C''}{N}$, and to the "linear-pitch" gear-set the value $C'\frac{1}{P^L}$. In effect, these two values are the factors of which the conventional formula ($L=NP^L$) for the lead of a worm is compounded, thus:

$$\frac{C'}{N} \times \frac{C''}{P^L} = \frac{1}{P^L}\frac{1}{N} \times (\text{the machine constant})$$

These values of U and V represent the ratios of the driver to the driven in the respective change-gear sets.

Considering the general proposition from another standpoint, we may initially set the "index" gears at a 1:1 ratio on the supposition that we are grinding a single-tooth worm that will require no indexing. In that event, we would arrange the "linear-pitch" gears so as unqualifiedly to respond to the conventional lead formula and thereby cause the transmission to convey motion from the table to the spindle at the lead ratio of NP. To do this, we would use the ratio:

$$\frac{C'C''}{NP^L}$$

This would correctly grind a single thread, but to index for another, we must introduce the factor $\frac{C''}{N}$ into the "index" set and simultaneously also introduce its reciprocal into the "linear-pitch" set, or anywhere else in the train on the other side of the one-revolution clutch so as not to alter the already selected ultimate ratio. Then, for the modified value of U, we would have:

$$\frac{C'C''}{NP^L} \times \frac{N}{C''} = C' \times \frac{1}{P^L} = C' \frac{\sine a}{P^{NC}} = C' \frac{\tan a}{P^c}, \text{ as before.}$$

I am aware of the United States Patent No. 1,100,525, on a worm grinder granted to Brown and Bostock, and also of Patents Nos. 1,161,242 and 1,252,487 on a similar machine but this invention essentially distinguishes therefrom structurally and in mode of operation in the manner specified in the following claims. These prior patents do not provide a single continuous main line transmission from the table to the spindle but resort to the use of a 3-way transmission with a differential gear mechanism arranged at the junction of the three branch lines or sections and the change-gear set that determines the indexing effect is not a component part of the transmission (as in my instance) and in the case of these patents, the indexing change-gears do not convey all of the motion to the spindle during the regular grinding period which follows the momentary indexing, as in my case. So also, these prior patents do not provide two change-gear sets arranged in series with an intervening definite-revolution clutch so that the one may be set for indexing and the other (modified by the first) may be adjusted to produce the predetermined linear-pitch. By reason of the underlying principles on which this machine is founded, the mechanism has been materially simplified and concomitantly, a greater precision and durability are attainable.

Without further analysis, the foregoing will so fully reveal the gist of this invention that others can, by applying current knowledge, readily adapt it for various utilizations without omitting certain features that, from the standpoint of the prior art, fairly constitute essential characteristics of the generic or specific aspects of this invention, and therefore such adaptations should be and are intended to be comprehended within the meaning and range of equivalency of the following claims.

Having thus revealed this invention, I claim as new and desire to secure the following combinations of steps and elements, or equivalents thereof, by Letters Patent of the United States:

1. A worm-grinder combining a spindle; a spindle-support; a grinder-support; means for effecting a relative translation between said supports in a direction parallel with the axis of the spindle; and a main-line transmission extending from the spindle to effect said support translations, said transmission including a one-revolution clutch, a change-gear set between said clutch and spindle for the purpose of indexing, and another change-gear set between said clutch and the translating-support for the purpose of determining the ratio between the translation of the support and the revolutions of the spindle; the components of the transmission being so arranged as to operate simultaneously in serial relation throughout the grinding operations of the machine.

2. A worm-grinder combining a spindle; a spindle-support; a grinder-support; a main transmission extending continuously from said spindle to one of said supports whereby it may be translated relatively to the other support; a clutch mechanism arranged in said transmission to automatically uncouple it for a definite and invariable number of revolutions when the translating support reaches a predetermined station in one of its reciprocations; a change-gear set arranged in said transmission between said clutch mechanism and said spindle to adjustably determine the extent of angular motion lost by said spindle through each operation of the clutch mechanism; and a second change-gear set arranged in the transmission between the translating support and said clutch mechanism to adjustably determine the ratio between the translation of the support and the revolutions of the spindle; the aforesaid components of the transmission being so arranged as to operate simultaneously in serial relation throughout each working period of the machine.

3. A worm-grinder combining a spindle; a spindle-support; a grinder-support; a transmission extending from the spindle to reciprocate one of said supports relative to the other; a clutch mechanism in said transmission for momentarily interrupting the continuity thereof; and a trip device arranged to be operatively actuated by the reciprocating support during the initial portion of its working stroke to introduce a lag in the reversal of the spindle.

4. A worm-grinder combining a spindle; a spindle-support; a grinder-support; a main transmission extending continuously from said spindle to one of said supports whereby it may be translated relatively to the other support; a clutch mechanism arranged in said transmission to automatically uncouple it for a definite and invariable number of revolutions when the translating support reaches a predetermined station in one of its reciprocations; a device for causing said clutch to function either immediately before or immediately after a reversal in the direction of the support; a change-gear set arranged in said transmission between said clutch mechanism and said spindle to adjustably determine the extent of angular motion lost by said spindle through each operation of the clutch mechanism; and a second change-gear set arranged in the transmission between the translating support and said clutch mechanism to adjustably determine the ratio between the translation of the support and the revolutions of the spindle; the aforesaid components of the transmission being so arranged as to operate simultaneously in serial relation throughout each working period of the machine.

5. A worm-grinder combining a spindle; a spindle-support; a grinder-support; a positive motion transmission extending from the spindle to the spindle-support to reciprocate it; an automatic clutch mechanism for momentarily interrupting the continuity of said transmission for indexing purposes; an impositive motion transmission extending to the grinder-support for shifting it toward and from the spindle-support; and means for reversing the direction of movement in said two transmissions to effect a return stroke of the spindle-support and a withdrawal of the tool from the work during said return stroke.

6. A worm-grinder combining a spindle; a spindle-support; a grinder-support; means providing a relative translation between said supports in a direction parallel with the axis of the spindle; a transmission extending from the spindle to effect said support translations, said transmission including a one-revolution clutch, a change-gear set between said clutch and spindle for the purpose of indexing, and another change-gear set between said clutch and the translating-support for the purpose of determining the ratio between the translation of the support and the revolutions of the spindle; the parts being so arranged as to operate simultaneously in serial relation throughout the grinding operations of the machine; means for driving said transmission; a reverser therefor; and means for operating said clutch at alternate operations of said reverser.

7. A worm-grinder combining a spindle; a spindle-support; a grinder-support; means providing a relative translation between said supports in a direction parallel with the axis of the spindle; a transmission extending from the spindle to effect said support translations, said transmission including a one-revolution clutch, a change-gear set between said clutch and spindle for the purpose of indexing, and another change-gear set between said clutch and the translating-support for the purpose of determining the ratio between the translation of the support and the revolutions of the spindle; the components of said transmission being so arranged as to operate simultaneously in serial relation throughout the grinding operations of the machine; a power-driven means for imparting motion to said transmission; a reverser therefor, adapted to be actuated automatically by the translating-support; and means operable immediately after throwing the reverser to momentarily shift said clutch.

8. A worm-grinder combining a spindle; a spindle-support; a grinder-support; means providing a relative translation between said supports in a direction parallel with the axis of the spindle; a positive-motion transmission extending from the spindle to effect said support translations, said transmission including a one-revolution clutch, a change-gear set between said clutch and spindle for the purpose of indexing, and another change-gear set between said clutch and the translating-support for the purpose of determining the ratio between the translation of the support and the revolutions of the spindle; the parts being so arranged as to operate simultaneously in serial relation throughout the grinding operations of the machine; means providing a relative translation between said supports in a transverse direction; an impositive transmission therefor; fixed stops limiting the effect of said impositive transmission; and a master-reverser effective on both of said transmissions.

9. A worm-grinder combining a stationary base; a spindle-support reciprocable on said base; a grinder-support shiftable on said base toward and from the spindle support; a positive motion transmission extending from the spindle to the spindle-support; a clutch serially included in said transmission; and automatic means for opening said clutch and keeping it open until the driving element of said clutch has moved through a predetermined number of revolutions relatively to the driven element of said clutch, said automatic means being invariable.

10. A worm-grinder combining a stationary base; a spindle-support reciprocable on said base; a grinder-support shiftable on said base toward and from the spindle support; a positive motion transmission extending from the spindle to the spindle-support; a clutch serially included in said transmission; automatic means for opening said clutch and keeping it open until the driving element of said clutch has moved through a predetermined number of revolutions relatively to the driven element of said clutch, said automatic means being invariable; and an instrumentality for causing said automatic means to function at a predetermined station in the cycle of reciprocations of said spindle-support.

11. A worm-grinder combining a stationary base; a spindle support reciprocable on said base; a grinder-support shiftable on said base toward and from the spindle-support; a positive motion transmission extending from the spindle to the spindle-support; and a one-revolution clutch serially included in said transmission.

12. A worm-grinder combining a spindle; a spindle-support; a grinder support; means providing a relative translation between said supports in a direction parallel with the axis of the spindle; a positive motion transmission extending from the spindle to effect said support translations; a one-revolution clutch serially included in said transmission; and a trip mechanism operating at a predetermined station in the movement of the translating-support for causing said clutch to function.

13. A worm-grinder combining a spindle; a spindle-support; a grinder-support; means providing a relative translation between said supports in a direction parallel with the axis of the spindle; a positive motion transmission extending from the spindle to effect said support translations; a one-revolution clutch serially included in said transmission; a trip mechanism operating at a predetermined station in the movement of the translating-support for causing said clutch to function; and a change-gear set serially included in said transmission between said clutch and said spindle and adjustable for the purpose of indexing.

14. A worm-grinder combining a spindle; a spindle-support; a grinder-support; means providing a relative translation between said supports in a direction parallel with the axis of the spindle; a positive motion transmission extending from the spindle to effect said support translations; a one-revolution clutch serially included in said transmission; a trip mechanism operating at a predetermined station in the movement of the translating-support for causing said clutch to function; and a change-gear set serially included in said transmission between said clutch and said translating-support for the purpose of determining the ratio between the translation of the support and the revolution of the spindle.

15. A worm-grinder combining a spindle; a spindle-support; a grinder-support; means providing a relative translation between said supports; a positive-motion transmission extending from the spindle to its support for causing the spindle to rotate in a predetermined ratio to the translation of the support; and a clutch mechanism serially included in said transmission for disconnecting it for a predetermined number of revolutions of the driving element of the transmission; the value of the transmission between the spindle and said clutch being proportionate to the reciprocal of the number of teeth in the worm being ground and the value of the transmission between the support and said clutch being proportionate to the reciprocal of the linear-pitch of the worm being ground.

16. A worm-grinder combining a spindle; a spindle-support; a grinder-support; means providing a relative translation between said supports; a positive-motion transmission extending from the spindle to its support for causing the spindle to rotate in a predetermined ratio to the translation of the support; and a clutch mechanism serially included in said transmission for disconnecting it for a predetermined number of revolutions of the driving element of the transmission; the value of the transmission between the spindle and said clutch being proportionate to the reciprocal of the number of teeth in the worm being ground; and a change-gear serially interposed in the transmission between the clutch and the support adapted to be adjusted proportionate to the reciprocal of the linear-pitch of the worm being ground.

17. A worm-grinder combining a spindle; a spindle-support; a grinder-support; means providing a relative translation between said supports; a positive-motion transmission extending from the spindle to its support for causing the spindle to rotate in a predetermined ratio to the translation of the support; a clutch mechanism serially included in said transmission for disconnecting it for a predetermined number of revolutions of the driving element of the transmission; the value of the transmission between the support and the clutch being proportionate to the reciprocal of the linear-pitch of the worm being ground; and a change-gear interposed serially in the transmission between the clutch and the spindle whereby the last mentioned section of the transmission may be adjustably evaluated in proportion to the reciprocal of the number of teeth in the worm being ground.

18. A worm-grinder combining a spindle; a spindle-support; a grinder-support; means providing a relative translation between said supports; a positive-motion transmission extending from the spindle to its support for causing the spindle to rotate in a predetermined ratio to the translation of the support; a clutch mechanism serially included in said transmission for disconnecting it for a predetermined number of revolutions of the driving element of the transmission; a first change-gear serially interposed in the transmission between the support and the clutch; and a second change-gear serially interposed in the transmission between the clutch and the spindle, said change-gears being adjusted in proportion to the number of teeth and the linear-pitch, respectively, of the worm being ground.

In witness whereof, I hereunto subscribe my name, as attested by the two subscribing witnesses.

WILLIAM F. ZIMMERMANN.

Witnesses:
W. D. SCHUSTER,
H. EZRA EBERHARDT.